(12) United States Patent
Kato

(10) Patent No.: US 11,764,384 B2
(45) Date of Patent: Sep. 19, 2023

(54) SEGMENTED FRAMES FOR REDOX FLOW BATTERIES

(71) Applicant: STRYTEN CRITICAL E-STORAGE LLC, Alpharetta, GA (US)

(72) Inventor: Garrett Scott Kato, Arvada, CO (US)

(73) Assignee: STRYTEN CRITICAL E-STORAGE LLC, Alpharetta, GA (US)

( * ) Notice: Subject to any disclaimer, the term of this patent is extended or adjusted under 35 U.S.C. 154(b) by 0 days.

(21) Appl. No.: 17/702,279

(22) Filed: Mar. 23, 2022

(65) Prior Publication Data

US 2022/0216496 A1 Jul. 7, 2022

Related U.S. Application Data

(63) Continuation of application No. 16/643,790, filed as application No. PCT/US2018/049102 on Aug. 31, 2018, now Pat. No. 11,289,728.

(60) Provisional application No. 62/553,631, filed on Sep. 1, 2017.

(51) Int. Cl.
| | |
|---|---|
| *H01M 8/18* | (2006.01) |
| *H01M 8/0258* | (2016.01) |
| *H01M 8/0273* | (2016.01) |
| *H01M 8/04276* | (2016.01) |

(52) U.S. Cl.
CPC ......... *H01M 8/188* (2013.01); *H01M 8/0258* (2013.01); *H01M 8/0273* (2013.01); *H01M 8/04283* (2013.01)

(58) Field of Classification Search
CPC .. H01M 8/188; H01M 8/0258; H01M 8/0273; H01M 8/04283
See application file for complete search history.

(56) References Cited

U.S. PATENT DOCUMENTS

| | | |
|---|---|---|
| 5,300,370 A | 4/1994 | Washington et al. |
| 5,482,680 A | 1/1996 | Wilkinson et al. |
| 5,641,586 A | 6/1997 | Wilson |
| 6,194,095 B1 | 2/2001 | Hockaday |
| 6,261,711 B1 | 7/2001 | Matlock et al. |
| 6,303,245 B1 | 10/2001 | Nelson |
| 6,416,892 B1 | 7/2002 | Breault |
| 6,485,857 B2 | 11/2002 | Perry et al. |
| 6,503,653 B2 | 1/2003 | Rock |

(Continued)

FOREIGN PATENT DOCUMENTS

| | | |
|---|---|---|
| CN | 1326275 C | 7/2007 |
| JP | 2000260461 A | 9/2000 |

(Continued)

OTHER PUBLICATIONS

International Search Report and Written Opinion From International Application No. PCT/US2018/049102, dated Jan. 2, 2019.
PCT International Preliminary Report on Patentability in Application PCT/US2018/037309, dated Dec. 26, 2019, 8 pages.
PCT International Preliminary Reprot on Patentability in Application PCT/US2018/049102, dated Mar. 12, 2020, 8 pages.

(Continued)

*Primary Examiner* — Adam A Arciero
(74) *Attorney, Agent, or Firm* — CANTOR COLBURN LLP

(57) ABSTRACT

A segmented frame plate is provided, which may be used in a frame plate assembly of a redox flow battery cell stack. A plurality of segmented frame plates may couple together around a perimeter of a cell plate. Each segmented frame plate may provide fluidic communication from/to a redox flow reservoir and/or another frame plate assembly to a cell plate of the frame plate assembly.

17 Claims, 13 Drawing Sheets

(56) References Cited

U.S. PATENT DOCUMENTS

| | | |
|---|---|---|
| 6,503,654 B2 | 1/2003 | Marchetti |
| 6,780,533 B2 | 8/2004 | Yi et al. |
| 7,067,213 B2 | 6/2006 | Boff et al. |
| 7,838,139 B2 | 11/2010 | Turpin et al. |
| 9,166,243 B2 | 10/2015 | Perry |
| 2004/0170893 A1 | 9/2004 | Nakaishi et al. |
| 2005/0048351 A1 | 3/2005 | Hood et al. |
| 2005/0191540 A1 | 9/2005 | Otsuka |
| 2007/0105000 A1 | 5/2007 | Chapman et al. |
| 2008/0090129 A1 | 4/2008 | Kunz et al. |
| 2008/0241618 A1 | 10/2008 | Sato et al. |
| 2008/0248365 A1 | 10/2008 | Wilkinson et al. |
| 2008/0274390 A1 | 11/2008 | Ueda et al. |
| 2008/0292938 A1 | 11/2008 | Perry et al. |
| 2009/0035644 A1 | 2/2009 | Markoski et al. |
| 2009/0047571 A1 | 2/2009 | Harper |
| 2009/0169962 A1 | 7/2009 | Hsing et al. |
| 2011/0236783 A1 | 9/2011 | Darling |
| 2011/0293982 A1 | 12/2011 | Martz et al. |
| 2012/0156535 A1 | 6/2012 | Harrer et al. |
| 2012/0244395 A1 | 9/2012 | Perry |
| 2013/0157097 A1 | 6/2013 | Kampanatsanyakorn et al. |
| 2014/0060666 A1 | 3/2014 | Evans et al. |
| 2014/0227628 A1 | 8/2014 | Tang et al. |
| 2015/0064599 A1 | 3/2015 | Brauninger et al. |
| 2015/0125768 A1 | 5/2015 | Mosso et al. |
| 2016/0079624 A1 | 3/2016 | Brantley et al. |
| 2016/0164112 A1 | 6/2016 | Seipp et al. |
| 2017/0012308 A1 | 1/2017 | Ikeuchi |
| 2017/0110741 A1 | 4/2017 | Ito et al. |
| 2017/0324108 A1 | 11/2017 | Yamaguchi et al. |
| 2019/0109334 A1 | 4/2019 | Kato et al. |
| 2019/0015770 A1 | 5/2019 | Bitner et al. |
| 2020/0194809 A1 | 6/2020 | Kato |
| 2020/0220194 A1 | 7/2020 | Kato |
| 2021/0143450 A1 | 5/2021 | Kato |

FOREIGN PATENT DOCUMENTS

| | | |
|---|---|---|
| JP | 2002373677 A | 12/2002 |
| JP | 2004055220 A | 2/2004 |
| WO | 1997013287 | 4/1997 |
| WO | 2017174053 A1 | 10/2017 |
| WO | 2018231964 A1 | 12/2018 |

OTHER PUBLICATIONS

PCT International Search Report and Written Opinion From International Application No. PCT/US2018/037309, dated Oct. 10, 2018.

Bartolozzi, M. "Development of Redox Flow Batteries: A Historical Bibliography", Dept. of Chemical Engineering, Univ. of Pisa, Italy, 1989, pp. 219-234.

Biyikoglu, Atilla, "Review of Proton Exchange Membrane Fuel Cell Models", Int'l. Journal of Hydrogen Energy, 30 (2005), pp. 1181-1212.

He, Wenshang et al., "Two-Phase Flow Model of the Cathode of PEM Fuel Cells Using Interdigitaled Flow Fields", AlChE Journal, Oct. 2000, pp. 2053-2064.

Liu, H.C. et al., "Reactant Gas Transport and Cell Performance of Proton Exchange Membrane Fuel Cells With Tapered Flow Field Design", Journal of Power Sources, 158 (2006), pp. 78-87 Membrane Fuel Cells With Tapered Flow Field Design, Journal of Power Sources, 158 (2006), pp. 78-87.

Liu, Hui-Chang et al., "Effects of Baffle-Blocked Flow Channel on Reactant Transport and Cell Performance of a Proton Exchange Membrane Fuel Cell", Journal of Power Sources, 142 (2005), pp. 125-133.

Nguyen, Trung V., "A Gas Distributor Design for Proton-Exchange-Membrane Fuel Cells", J. Electrochem. Soc., vol. 143, No. 5, May 1996, pp. L103-L105.

Soong, C. Y. et al., "Analysis of Reactant Gas Transport in a PEM Fuel Cell With Partially Blocked Fuel Flow Channels", Journal of Power Sources, 143, (2005), pp. 36-47.

Wang, Lin, et al., "Performance Studies of PEM Fuel Cells with Interdigital flow fields", Jounal of Power Sources, 134 (2004) pp. 185-196.

Wilson, Mahlon S., et al., "Alternative Flow-Field and Backing Concepts for Polymer Electrolyte Fuel Cells", Los Alamos National Laboratory, New Mexico, Aug. 29, 1995, 15 pages.

Wood, David L., et al., "Effect of Direct Liquid Water Injection and Interdigitaled Flow Field on the Performance of Proton Exchange Membrane Fuel Cells", Submitted as a Research Paper to Electrochimica Acta Journal, Dec. 2, 1997, 30 pages.

Yan, Wei-Mon et al., "Numerical Study on Cell Performance and Local Transport Phenomena of PEM Fuel Cells With Novel Flow Field Designs", Journal of Power Sources, 161, (2006), pp. 907-919.

Yi, Jung Seok et al., "Multicomponent Transport in Porous Electrodes of Proton Exchange Membrane Fuel Cells Using the Interdigitated Gas Distributors", Journal of The Electrochemical Society, 146(1), pp. 38-45, (1999).

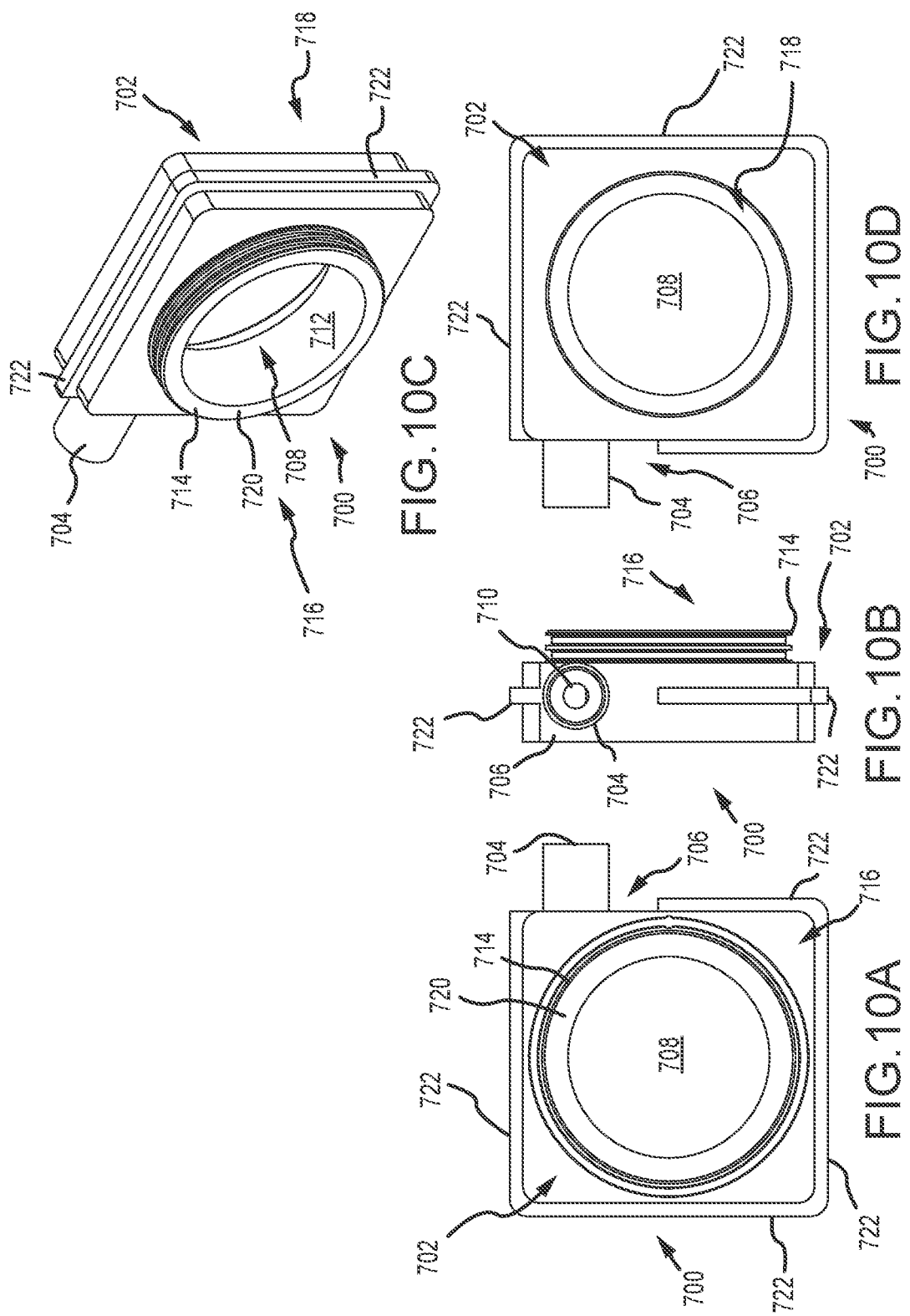

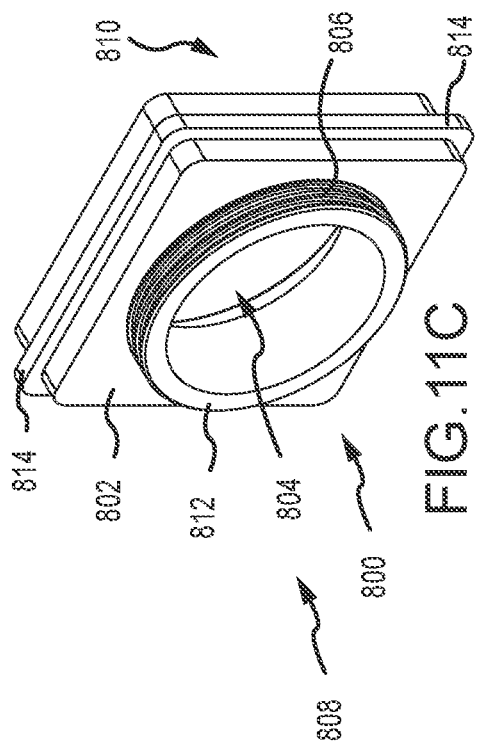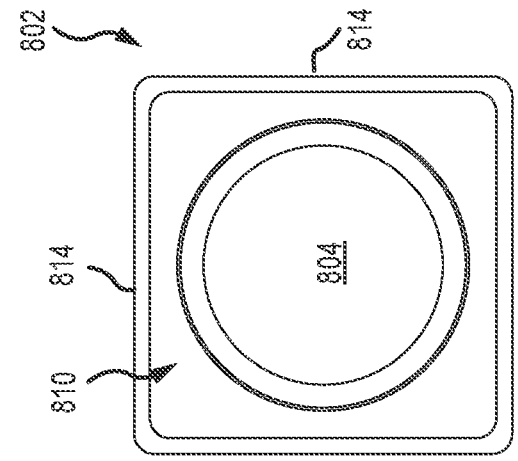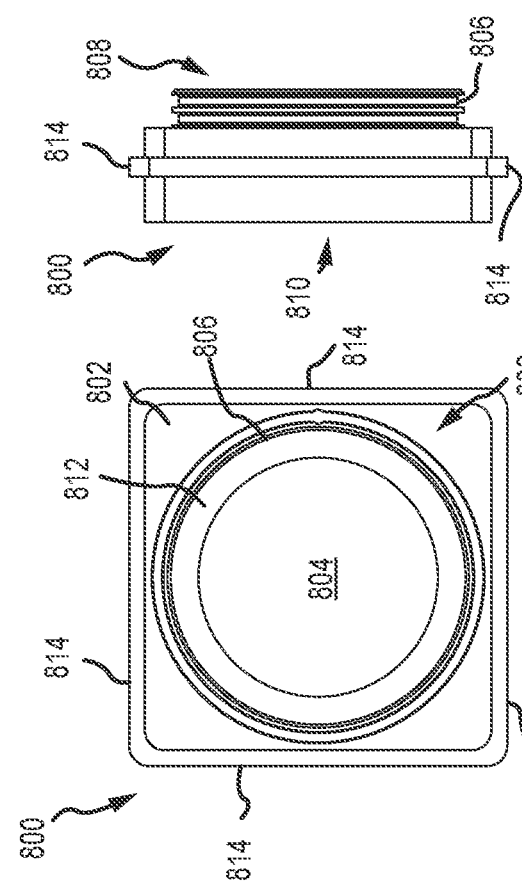

SEGMENTED FRAMES FOR REDOX FLOW BATTERIES

CROSS REFERENCE TO RELATED APPLICATIONS

This application is continuation application of U.S. patent application Ser. No. 16/643,790 filed Mar. 2, 2020, which claims priority to PCT International patent application No. PCT/US2018/049102 filed Aug. 31, 2018, and which claims the benefit of U.S. Provisional Patent Application No. 62/553,631, filed Sep. 1, 2017, the disclosures of which are hereby incorporated by reference herein in their entirety.

INTRODUCTION

The rechargeable flow battery (i.e. a redox flow battery) stores chemical energy in electrolyte solutions that contain electro-active elements. Conversion of this chemical energy to electrical energy may be captured and used for the purposes of powering a variety of devices and/or delivered to a power grid.

A typical rechargeable flow battery will have one or more cells. The cell will have an anolyte solution portion and a catholyte solution portion. These portions are separated by a membrane. Reservoirs containing additional anolyte and catholyte solutions are fluidically coupled to the anolyte portion and catholyte portion of the cell, respectively. As each electrolyte solution is circulated through its respective portion of the cell, the membrane allows for proton exchange between the anolyte solution and the catholyte solution. A current collector (e.g., an electrode) transfers the energy associated with the electron exchange between the anolyte and the catholyte to or from a power source depending on whether the redox-flow battery is being charged or discharged.

Current redox flow technology is limited by several issues. For example, membrane fouling, cross contamination of electrolyte solutions, electrical shunt paths, and increased fluid resistance. Additionally, preventing cross contamination of electrolyte solutions between cells and between the portions of a cell while reducing manufacturing costs continues to be challenging with current redox flow technology.

It is with respect to these and other considerations that aspects of the technology have been disclosed. Also, although relatively specific problems have been discussed, it should be understood that the technology disclosed herein should not be limited to solving the specific problems identified in the background or the disclosure.

Redox Flow Battery

Aspects of the technology relate to a redox flow battery with a cell plate and a frame, together which form a frame plate assembly. In embodiments, multiple frame plate assemblies are stacked together to form a cell stack. The cell plates are fluidically coupled to the frame of the frame plate assembly. In aspects of the technology, the frame may be segmented with two or more component so as to increase the flatness and decrease the manufacturing tolerances for each frame component. As such, the number of frame plate assemblies that may be stacked together is increased while reducing uneven and/or bulging cell stacks. This, in aspects, increasing cell stack and redox-flow battery system efficiencies. Additionally, the technology described herein may increase the cell stack density, which may increase the cell stack heat exchange coefficient and thermal management characteristics in embodiments.

The cell stack is fluidically coupled to a reservoir, in aspects, using manifold inserts (e.g., piping) to provide electrolyte solutions from a cell reservoir to the cell stack. In aspects of the technology, the frame may house an electrolyte pathway which feeds and/or returns electrolytes from a frame channel to a cell plate. Frame channels across frame plates in a cell stack may align to form a combined channel, which channel may feed multiple cell plates of the cell stack.

These and various other features as well as advantages that characterize the systems and methods described herein will be apparent from a reading of the following detailed description and a review of the associated drawings. Additional features are set forth in the description which follows. Also, additional features t will be apparent from the description or may be learned by practice of the technology. The benefits and features of the technology will be realized and attained by the structure particularly pointed out in the written description and claims hereof as well as the appended drawings.

BRIEF DESCRIPTION OF THE DRAWINGS

Non-limiting and non-exclusive embodiments are described with reference to the following figures.

FIGS. 10A-10D illustrate various views of an example radial connector insert that may be used with the frame segment shown in FIG. 9.

FIGS. 11A-11D illustrate various views of an example radial spacer insert that may be used with the frame segment shown in FIG. 9.

DETAILED DESCRIPTION

Figure 1:
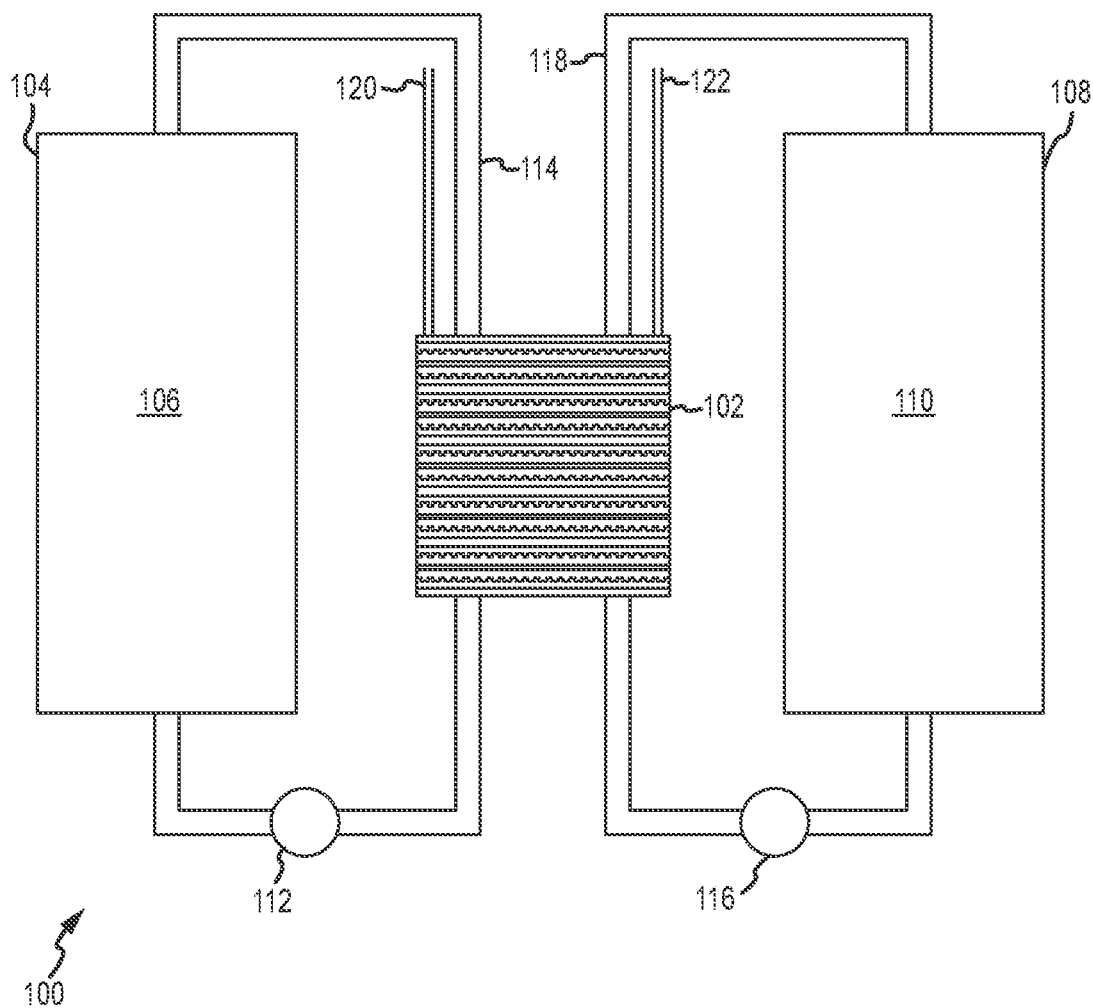
FIG. 1 illustrates an example redox flow battery environment in which aspects of the technology may be implemented.

FIG. 1 illustrates an example of a redox-flow battery system 100 having a cell stack 102. As illustrated, the redox-flow battery system 100 also includes a catholyte reservoir 104 holding a catholyte solution 106 and an anolyte reservoir 108 holding an anolyte solution 110. A first pumping mechanism 112 is used to circulate the catholyte solution 106 from the catholyte reservoir 104 to the cell stack 102 and back via a catholyte pathway 114 and a second pumping mechanism 116 is used to circulate the anolyte solution 110 from the anolyte reservoir 108 to the cell stack 102 and back via a anolyte pathway 118. Additionally, a catholyte current collector 120 and an anolyte current collector 122 are present.

In an embodiment, the redox-flow battery system 100 may be one of a vanadium-vanadium redox flow battery, a polysulfide bromide battery, an iron-chromium battery, or a manganese-vanadium redox flow battery. In an embodiment where the redox-flow battery system 100 is a vanadium redox flow battery, the catholyte solution 106 is substantially $V^{5+}$ in the charged state. Additionally, where the battery is in the charged state, the anolyte solution 110 is substantially $V^{2+}$. In an embodiment where the system is a polysulfide bromide battery, the catholyte solution 106 is substantially sodium tribromide, and the anolyte solution 110 is substantially sodium disulfide in a charged state. In an embodiment where the system is an iron-chromium battery, the catholyte solution 106 is substantially $Fe^{3+}$, and the anolyte solution 110 is substantially $Cr^{2+}$ in a charged state. In an embodiment where the system is a manganese-vanadium battery, the catholyte solution 106 is substantially $Mn^{3+}$, and the anolyte solution 110 is substantially $Vn^{2+}$ in a charged state. It will be appreciated that the technologies described herein may be used with other redox-flow battery chemistries.

The cell stack 102 may include a plurality of cell plates as described in further detail below. Each cell plate of the cell stack 102 facilitates the exchange of electrical energy between the catholyte and the electrolyte during a charge/discharge cycle. Each cell plate, which includes a proton exchange membrane positioned between the two electrodes, allows the transfer of a proton from the catholyte to the anolyte during the discharge cycle, and a current collector facilitates the exchange of an electron from the anolyte to the catholyte during the discharge cycle. The cells stack may have cells that are in series or are in parallel. While only one cell stack 102 is illustrated, it will be appreciated that multiple cell stacks may be electrically coupled together in either series or parallel.

In an embodiment, one or more mechanical pumps are used as the first pumping mechanism 112 and the second pumping mechanism 116 to circulate the catholyte solution 106 and the anolyte solution 110, respectively. Other methods and/or equipment may be used to provide circulation of the catholyte solution 106 between the catholyte reservoir 104 and the cell stack 102, as well as to circulate the anolyte solution 110 between the anolyte reservoir 108 and the cell stack 102 as required or desired.

As illustrated, the catholyte reservoir 104 is fluidically coupled to the cell stack 102 by the catholyte pathway 114 (which may be a tube, a pipe, or the like), and the anolyte reservoir 108 is fluidically coupled to the cell stack 102 by the anolyte pathway 118 (which may be a tube, a pipe, or the like). It will be appreciated that one or more cell stacks 102 may be configured to be fluidically coupled together in series and/or parallel as required or desired and as described further below.

Figure 2:
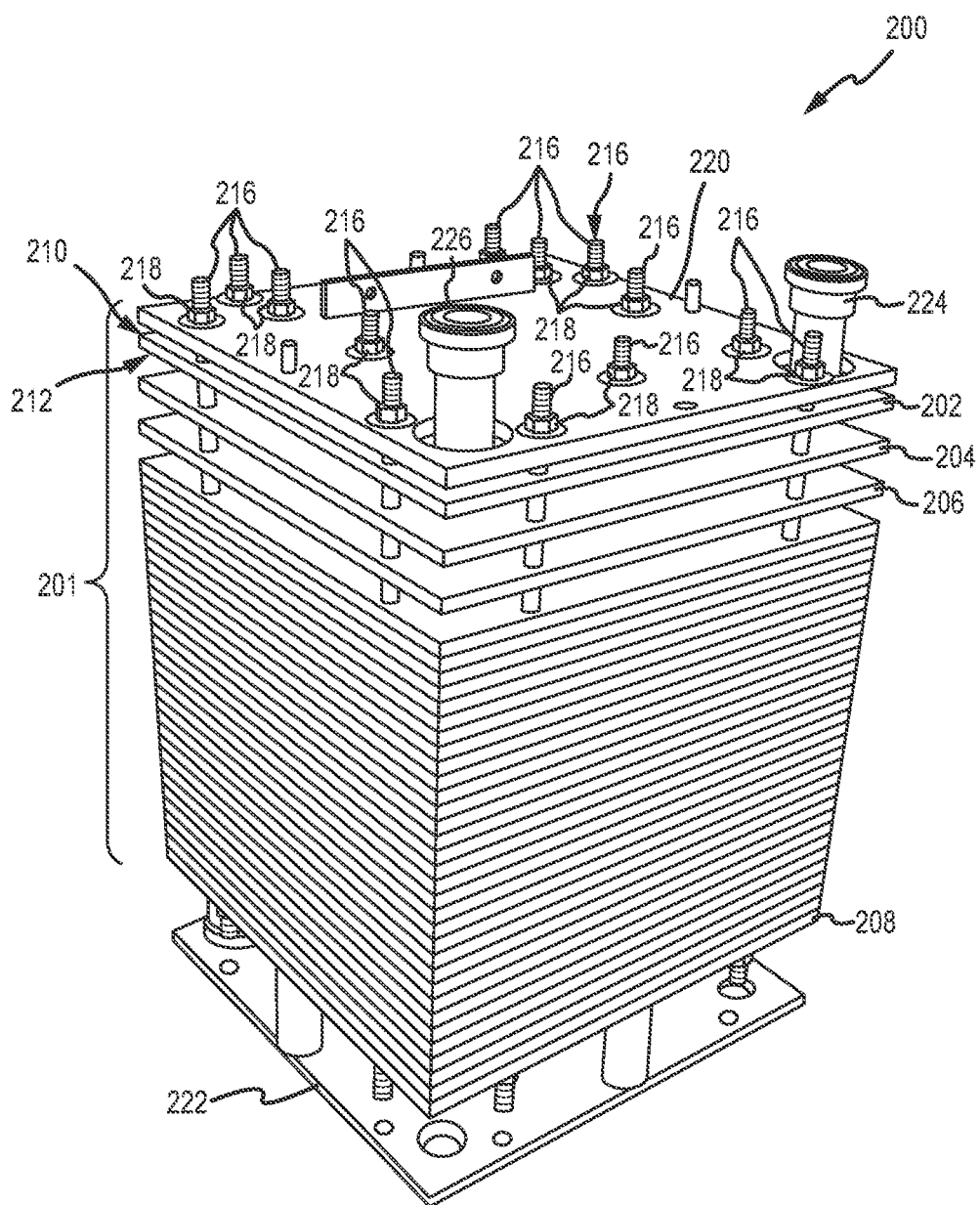
FIG. 2 illustrates a schematic perspective view of an example cell stack system.

FIG. 2 illustrates a schematic-perspective view of an example cell stack system 200. In aspects of the technology, the cell stack system 200 includes a plurality of frame plate assemblies 201. The plurality of frame plate assemblies 201 includes a first frame plate assembly 202, a second frame plate assembly 204, and a third frame plate assembly 206, up to an $n^{th}$ or last frame plate assembly 208. The plurality of frame plate assemblies 201 may have any number of frame plate assemblies as required or desired. As illustrated, each frame plate assembly, such as the first frame plate assembly 202, the second frame plate assembly 204, the third frame plate assembly 206, and the last frame plate assembly 208 are shaped as similar sized rectangular prisms. In alternative examples, each frame plate assembly 204, 206, 206, 208 may have any other shape, or size, or differing shapes/sizes that enables the cell stack system 200 to function as described herein.

It will be appreciated that each frame plate assembly has a front face and a back face as described further below. For example, the first frame plate assembly 202 has a front face 210 and an opposite back face 212. In aspects of the technology, the front face 210 and the back face 212 are substantially perpendicularly planar. In aspects of the technology, the back face 212 of the first frame plate assembly 202 is disposed proximate to a front face of the second frame plate assembly 204, a back face of the second frame plate assembly 204 is disposed proximate to a front face of the third frame plate assembly 206, and so on. Each frame plate assembly includes, in embodiments, a frame and a cell plate (e.g., a monopolar or bipolar plate comprising carbon paper electrodes and a membrane), which the cell plate is used to facilitate the charging/discharging of a redox flow battery. Various embodiments of the frame plate assembly are discussed in further detail below with references to FIGS. 4-11.

The plurality of frame plate assemblies 201 may be coupled together using one or more framing members 216. For example, the back face 212 of the first frame plate assembly 202 may be coupled to the front face of the second frame plate assembly 204 using one or more framing members 214 that also couples the back face of the second frame plate assembly 204 to the front face of the third frame plate assembly 206, and so on.

Coupling may occur through a variety of means. As illustrated, the plurality of frame plate assemblies 201 are coupled together using framing rods 216. The framing rods 216 orthogonally penetrate the front face 210 and the back face 212 of the first frame plate assembly 202. The framing rod 216 is a type of framing member 216. In aspects of the technology, the framing members 216 may be rods, plates, walls, shafts, and/or any item capable of coupling each of the plurality of frame plate assemblies 201 to adjacent frame plate assemblies. In aspects of the technology, the first frame plate assembly 202 has a plurality of bores operable to receive the plurality of framing rods 216. Additionally, fasteners 218 couple the framing rods 216 to the first frame plate assembly 202. Though the illustrated fasteners 218 are bolts that couple to a threaded end of the framing rods 216, it will be appreciated that other fastening technology is contemplated. Thus, the fasteners 218 are tightened to form a robust coupling, via pressure, with adjacent framing members in the cell stack.

Similarly, the second frame plate assembly 204 has a plurality of bores, which bores may be aligned with the bores of the first frame plate assembly 202 such that the plurality of framing rods 216 may be received. In alternative embodiments, other framing members may be used. The other frame plate assemblies in the plurality of frame plate assemblies 201 may have similarly aligned bores to receive the framing rods 216. As such, each frame plate assembly of the plurality of frame plate assemblies 201 may couple to the adjacent frames by sliding over the framing rods 216.

As illustrated, the plurality of framing rods 216 may be secured to a first mounting plate 220. The first mounting plate 220 may cap the top of the plurality of frame plate assemblies 201. That is, the first mounting plate 220 may be disposed on the front face 210 of the first frame plate assembly 202. Similarly, a second mounting plate 222 may cap the bottom of the plurality of frame plate assemblies 201. That is, the second mounting plate 222 may be disposed on the back face of the last frame plate assembly 208 and opposite the first mounting plate 220.

Additionally illustrated in FIG. 2 is electrolyte piping 224 and 226. The electrolyte piping fluidically couples an electrolyte reservoir, such as an anolyte reservoir or catholyte reservoir, to the plurality of frame plate assemblies 201. As illustrated, the electrolyte piping 224 and the electrolyte piping 226 penetrate through the first frame plate assembly 202 through an angle orthogonal to the front face 210 and the back face 212. The electrolyte piping 224 may deliver and/or return the electrolyte solution to each frame plate assembly in the plurality of frame plate assemblies 201. The electrolyte piping 224, 226 may be a separate component, as illustrated, or may be formed piecewise through the stacking and aligning channels (e.g., bores) of the plurality of frame plate assemblies 201 and as described further below.

The reservoirs may be the same as or similar to the electrolyte reservoirs described with references to FIG. 1. In aspects of the technology, each frame plate assembly is designed with a pathway such that an electrolyte solution may pass from the frame of a frame plate assembly to a cell plate of the frame plate assembly, and then to another frame plate assembly, and then ultimately to an electrolyte reservoir.

Figure 3A:
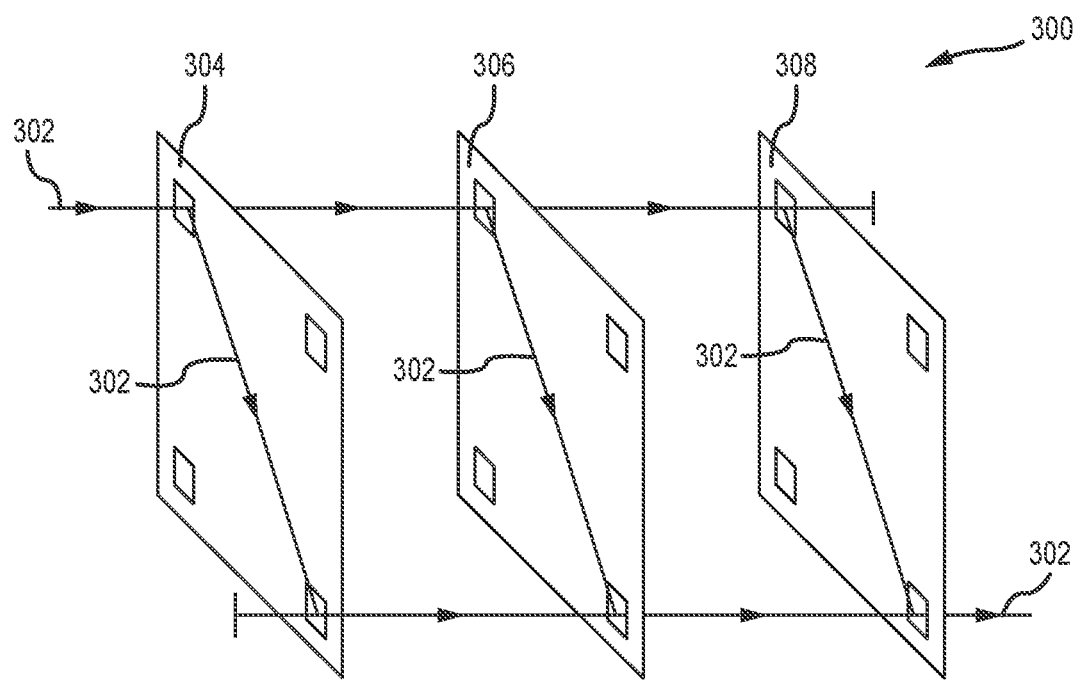
FIGS. 3A and 3B illustrate example electrolyte pathways between multiple frame plate assemblies of a redox cell stack.

FIG. 3A illustrates an example catholyte pathway between multiple frame plate assemblies of a redox cell stack 300. In aspects of the technology, a catholyte solution 302 enters a first frame plate assembly 304. The first frame plate assembly 304 may have a frame with a variety of channels, vias, membranes, porous material, and/or pathways to direct the flow of the catholyte solution 302 across a portion of the backside of the first frame plate assembly 304. In aspects, flow may be directed through a frame of the first frame plate assembly 304 into a cell portion of the first frame plate assembly 304. In aspects of the technology, flow into the cell portion of the first frame plate assembly 304 is directed across a backside of the membrane of the cell portion of the first frame plate assembly 304. Flow of the catholyte solution may be directed such that a laminar sheet-flow occurs across the backside of a membrane of a cell portion of the first frame plate assembly 304.

The catholyte solution 302 then proceeds to enter a second frame plate assembly 306. In aspects of the technology, the frame of the second frame plate assembly includes channels, vias, membranes, porous materials, and or/pathways to direct the flow of the catholyte solution 302 across a portion of a backside of the second frame plate assembly. Flow of 302 may enter and exit the second frame plate assembly 306 in a similar manner as the first frame plate assembly 304. In aspects, flow may be directed through a frame of the second frame plate assembly 306 into a cell portion of the second frame plate assembly. In aspects of the technology, flow into the cell portion of the second frame plate assembly 306 is directed across a backside of the membrane of the cell portion of the second frame plate assembly 306. Flow of the catholyte solution 302 may be directed such that a laminar sheet-flow occurs across the backside of a membrane of the cell portion of the second frame plate assembly 306.

This pattern of flow of the catholyte solution 302 may proceed to a plurality of other frame plate assemblies, including a third frame plate assembly 308, and/or to a reservoir. Flow of 302 may enter and exit the third frame plate assembly 308 in a similar manner as the first and second frame plate assembles 304, 306. In aspects of the technology, the catholyte solution 302 enters a frame plate assembly and flow may be directed such that the catholyte solution flows down a backside portion of the membrane of a cell portion of a plate assembly.

Figure 3B:
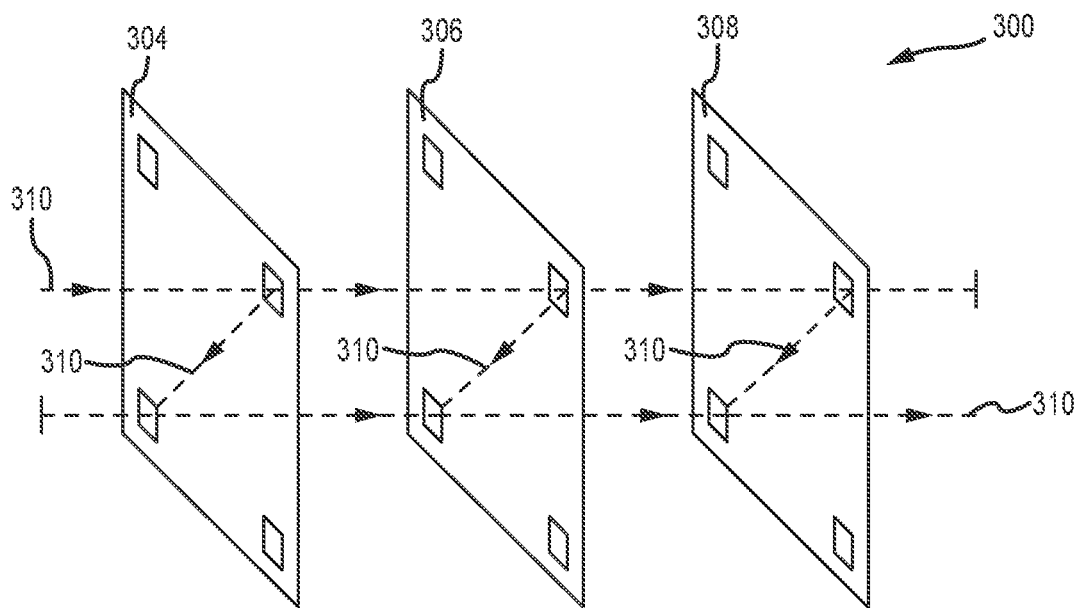

Illustrated in FIG. 3B is a flow of an anolyte solution 310. An anolyte solution may travel from the first frame plate assembly 304 to the second frame plate assembly 306. The first frame plate assembly 304 may have a frame with a variety of channels, vias, membranes, porous material, and/or pathways to direct the flow of the anolyte solution 310 across a portion of the front side of the first frame plate assembly 304. In aspects, flow may be directed through a frame of the first frame plate assembly 304 into a cell portion of the first frame plate assembly 304. In aspects of the technology, flow into the cell portion of the first frame plate assembly 304 is directed across a front side of the membrane of the cell portion of the first frame plate assembly 304. Flow of the anolyte solution 310 may be directed such that a laminar sheet flow occurs across the front side of the membrane of the cell portion of the first frame plate assembly 304.

The anolyte solution 310 then proceeds to enter the second frame plate assembly 306. Flow of the anolyte solution 310 may enter and exit the second frame plate assembly 306 in a similar manner as the first frame plate assembly 304. In aspects of the technology, the frame of the second frame plate assembly 306 includes channels, vias, membranes, porous materials, and or/pathways to direct the flow of the anolyte solution 310 across a front side of the second frame plate assembly 306. In aspects, flow may be directed through a frame of the second frame plate assembly 306 in a cell portion of the second frame plate assembly 306. In aspects of the technology, flow into the cell portion of the second frame plate assembly 306 is directed across a front side of the membrane of the cell portion of the second frame plate assembly 306. Flow of the anolyte solution 310 may be directed such that a laminar sheet flow occurs across the front side of a membrane of the cell portion of the second frame plate assembly 306.

This pattern of flow of the anolyte solution 310 may proceed to a plurality of other frame plate assemblies, including a third frame plate assembly 308, and/or to a reservoir. Flow of 310 may enter and exit the third frame plate assembly 308 in a similar manner as the first and second frame plate assembles 304, 306. In aspects of the technology, the anolyte solution 310 enters a frame plate assembly and flow may be directed such that the anolyte solution flows down a frontside portion of the membrane of a cell portion of a plate assembly.

In aspects of the technology, the catholyte solution 302 flows through a shared manifold (not shown). That is, in an example, each cell includes a flow path that enables an electrolyte to flow from an inlet to an outlet, and each frame plate assembly has an internal manifold insert, such as the electrolyte piping (shown in FIG. 2). Thus, stacking multiple frame plate assemblies may create a common supply and return manifolds via the electrolyte piping. This internal manifold supplies and returns electrolyte to the individual cells in a parallel flow configuration, in example embodiments. Other configurations are contemplated.

Figure 4:
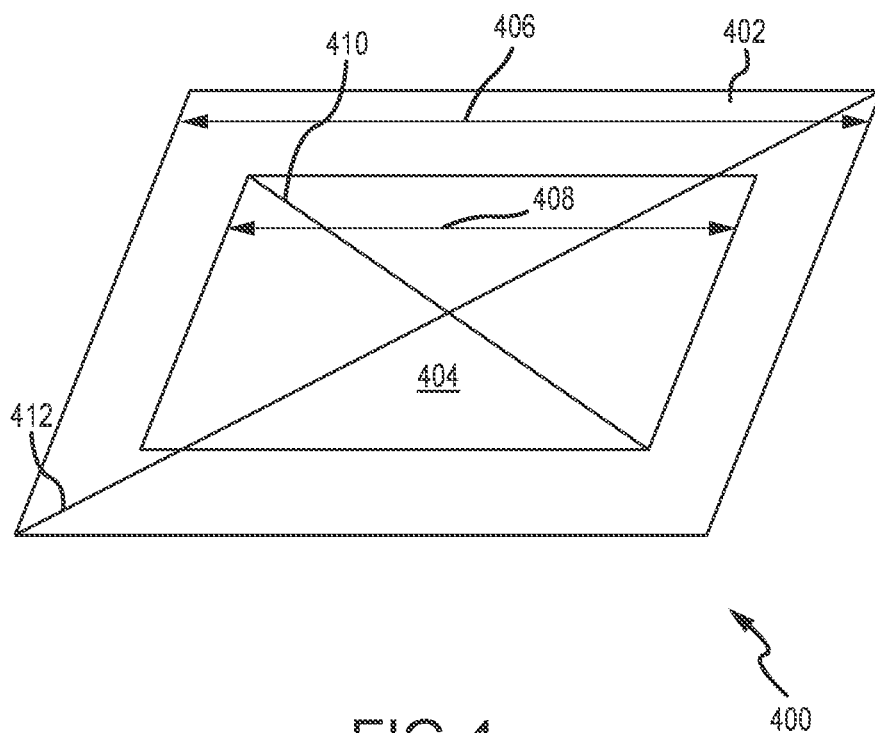
FIG. 4 illustrates a schematic view of an example frame plate assembly.

FIG. 4 illustrates a schematic view of an example frame plate assembly 400. The frame plate assembly 400 includes a frame 402 coupled in fluidic communication to a cell plate 404. In this example, the frame 402 is substantially square and has a length 406 that is approximately between 15 inches and 20 inches. While the cell plate 404 is also substantially square and has a length 408 that is approximately between 8 inches and 12 inches. As such, the frame 402 has a relatively large cross sectional length compared to the cell plate 404. In aspects of the technology, increasing flatness (defined as change in height over change in length) for a cell plate 404 is desirable to ensure a robust seal among cell plates in a cell stack. The frame 402 flatness is desirable, in aspects, to the extent the flatness of the frame 402 affects the sealing between cell plates. Thus, by reducing the frame plate assembly 402 flatness 412 effect on the sealing ability of the cell plate 402, the frame 402 flatness 412 manufacturing tolerance may be reduced. (It will be appreciated that some level of flatness is desirable to allow the frame 402 to be coupled to framing members to form a cell stack).

The frame plate assembly 400 may include a floating frame plate assembly as described in U.S. Patent Application No. 62/518,953 filed Jun. 13, 2017 and entitled "FLOATING FRAME PLATE ASSEMBLY," the disclosure of which is hereby incorporated by reference herein in its entirety. For example, the cell plate 404 may be manufactured with a relatively low tolerance and high flatness 410 of at least 0.0005 inches per linear 1 inch. In additional or alternative examples, the flatness 410 may be at least 0.0005 millimeters (mm) per 1 mm. While, the frame 402 may be manufactured with a relatively higher tolerance and lower flatness 412 of greater than 0.005 inches per linear 1 inch. In additional or alternative examples, the flatness 412 may be greater than 0.005 mm per linear 1 mm. By utilizing the floating frame plate assembly, the number of frame plate assemblies 400 stacked together in the cell stack may be increased because the frame 402 may move relative to the cell plate 404. As such, the undesirable results from higher manufacturing tolerances and lower flatness of the frame 402 are reduced within the system.

Figure 5:
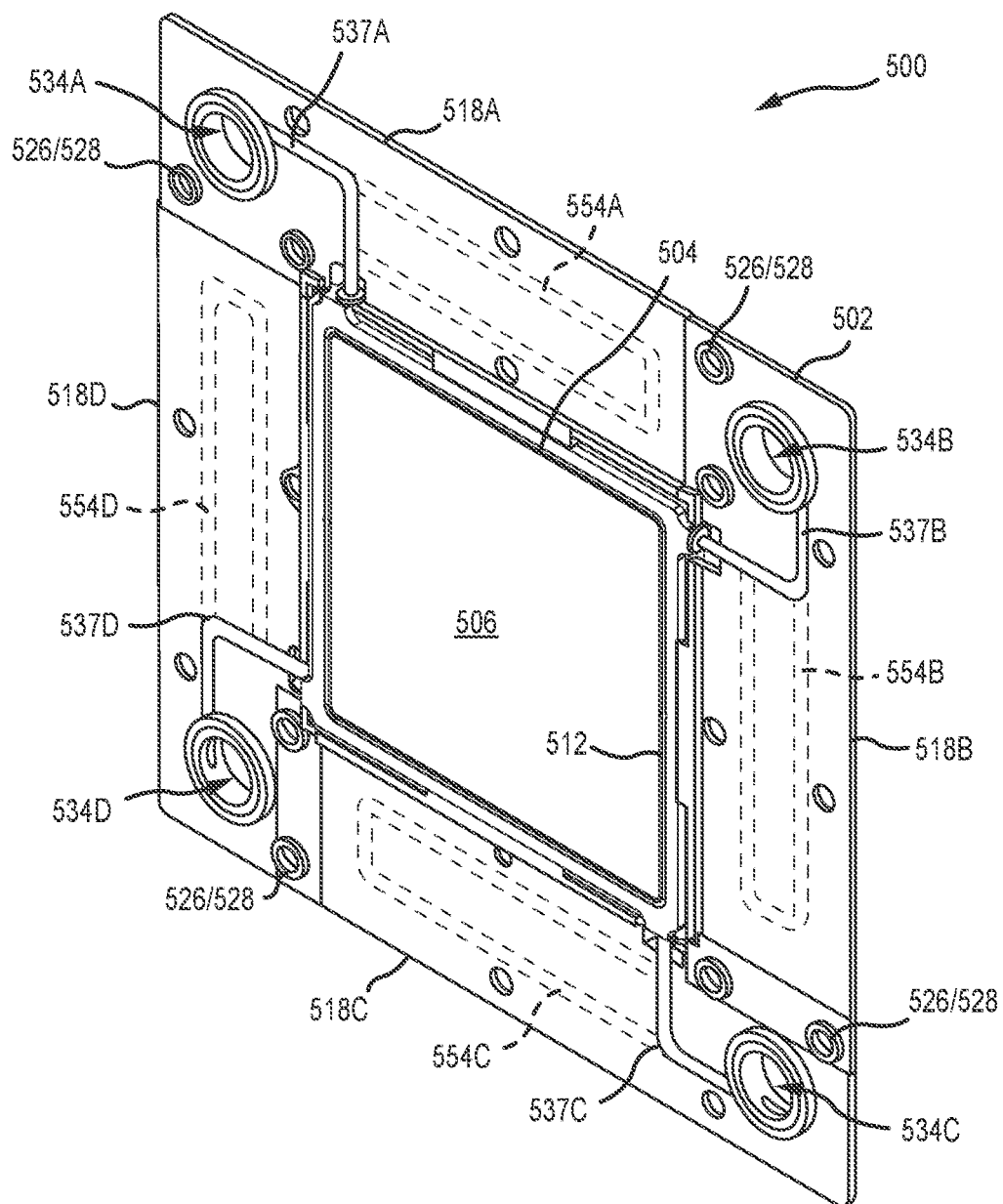
FIG. 5 illustrates a perspective view of another example frame plate assembly.
Figure 6:
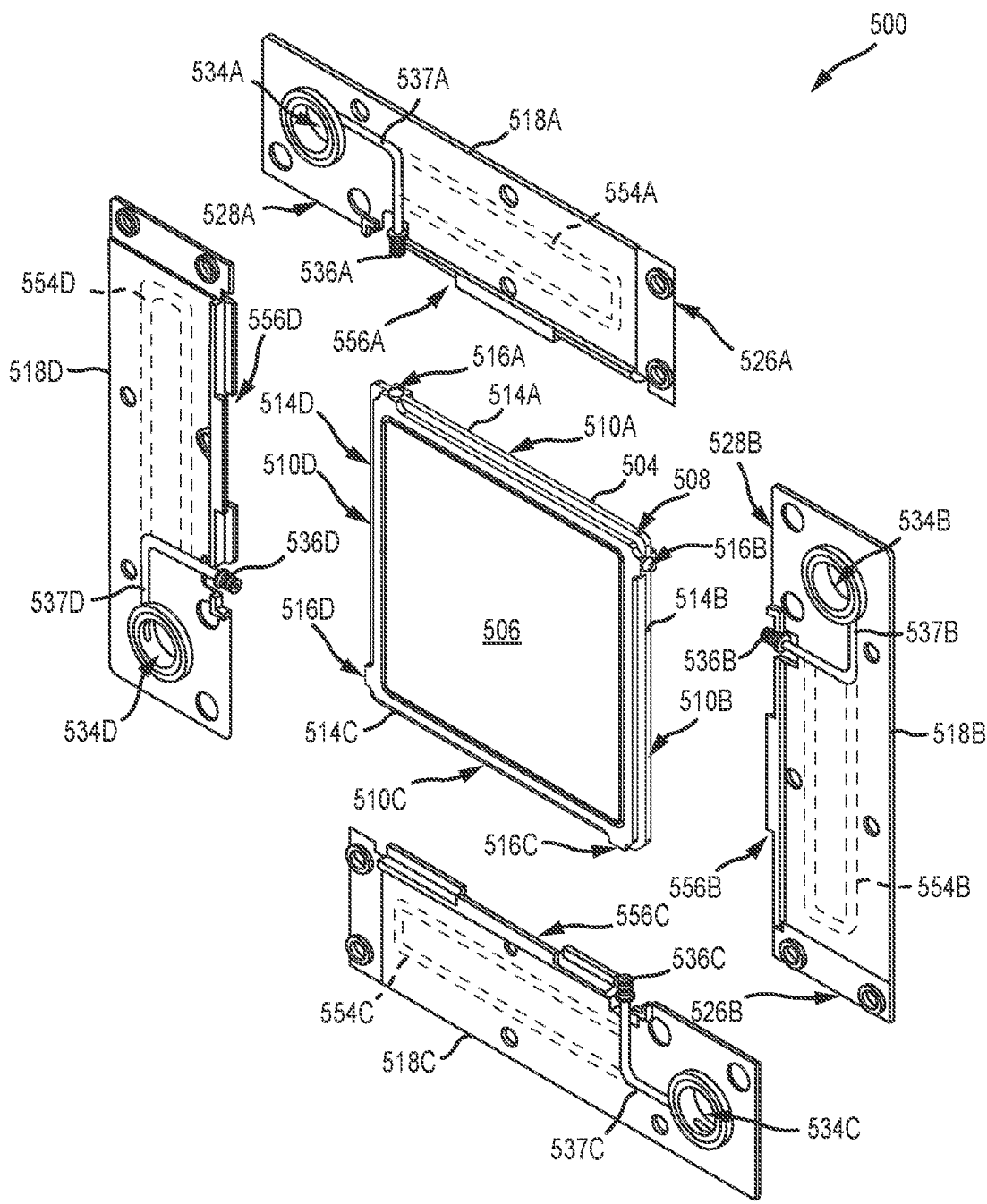
FIG. 6 illustrates an exploded view of the frame plate assembly shown in FIG. 5.

FIG. 5 illustrates a perspective view of another example frame plate assembly 500. FIG. 6 illustrates an exploded view of the frame plate assembly 500. Referring concurrently to FIGS. 5 and 6, the frame plate assembly 500 includes a frame assembly 502 coupled in fluidic communication to a cell plate 504. For the example, the cell plate 504 is a substantially rectangular prism with a front face 506 and an opposite back face 508. The cell plate 504 also includes four side walls 510 defining a perimeter 512 of the cell plate 504. Each side wall 510 includes a center flange 514 extending along the length of the side wall and an orifice 516 defined therein which may channel a flow of electrolytes therethrough.

The frame assembly 502 includes two or more interlocking frame segments 518 that surrounds the cell plate perimeter 512. The frame segments 518 may be manufactured out of a variety of materials, such as a rigid or semi-rigid plastic. In some examples, the frame segments 518 may be manufactured out of electrical isolating and heat conducting material. In this example, the frame assembly 502 includes four frame segments 518A, 518B, 518C, and 518D. However, in alternative examples, the frame assembly 502 may include any number of frame segments that enable the frame plate assembly 500 to function as described herein. For example, the frame assembly 502 may include two, three, five, or more segments. By modulating the frame assembly 502, each frame segment 518 has a lower surface area such that manufacturing tolerances may be decreased and flatness may be increased. This may be so because, for some manufacturing processes, maintaining flatness across a larger distance is more costly and/or time consuming. Accordingly, having a smaller distance upon which to maintain a flatness may allow for a lower overall manufacturing tolerance of the frame plate assembly 500 while still achieving the same or better flatness levels. This may in turn enable a greater number of frame plate assemblies to be stacked within the cell stack. Additionally, the cell stack increases in density so as to increase its heat exchange coefficient and thermal management characteristics.

Figure 7:
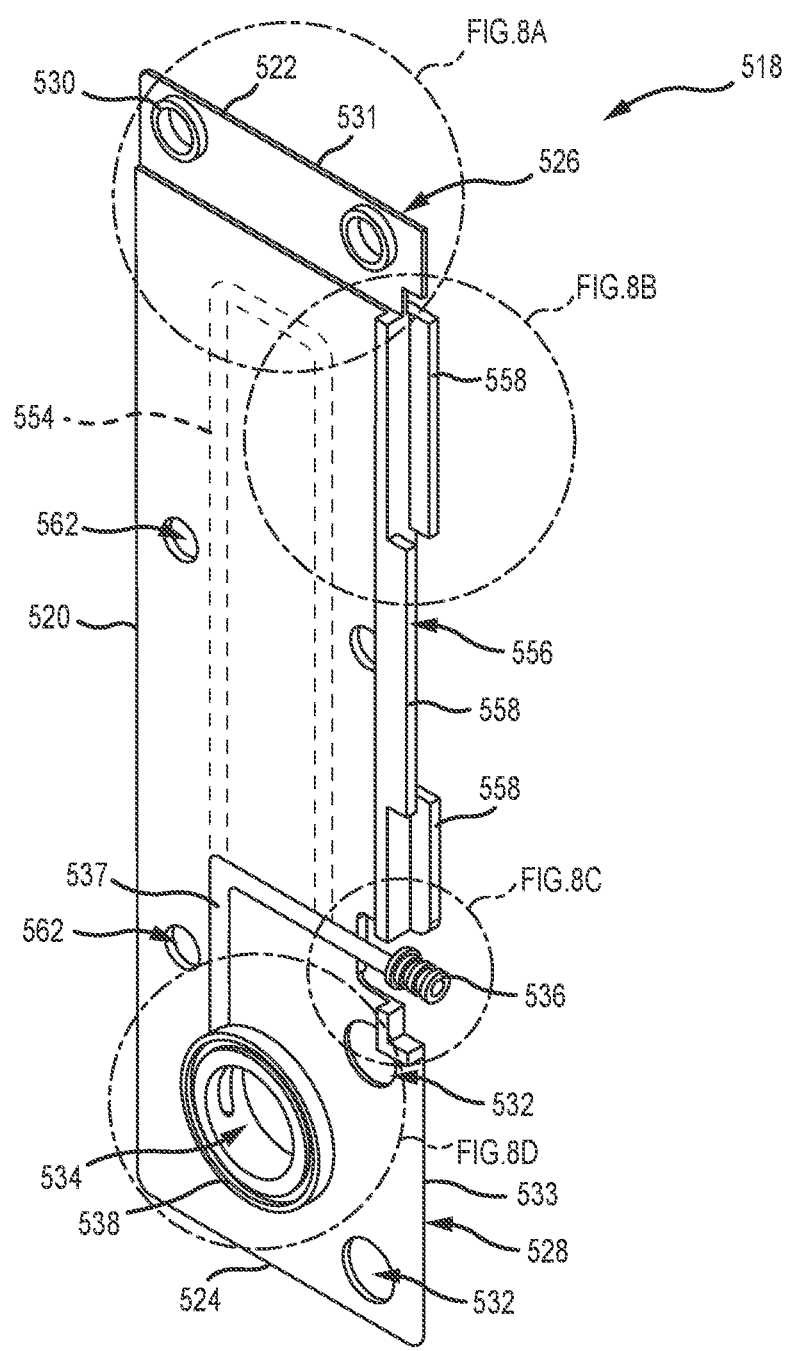
FIG. 7 illustrates a perspective view of an example frame segment of the frame plate assembly shown in FIG. 5.
Figure 8A:
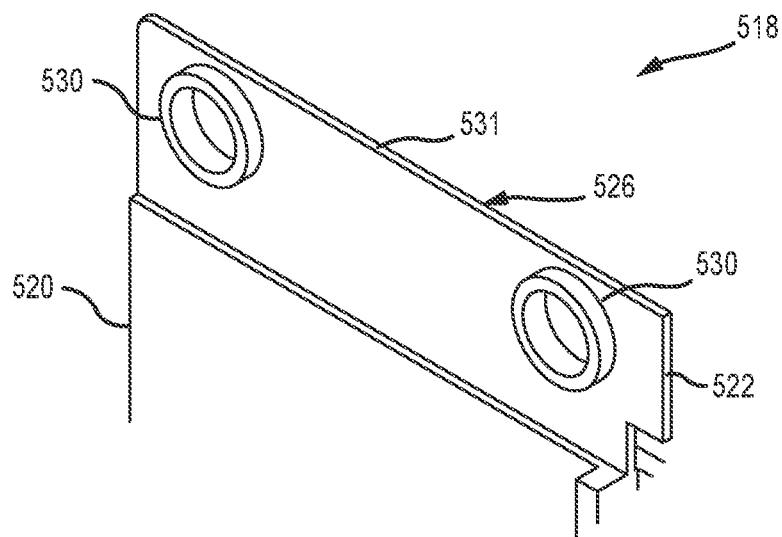
FIG. 8A-8D illustrate enlarged detail views of the frame segment shown in FIG. 7.
Figure 8B:
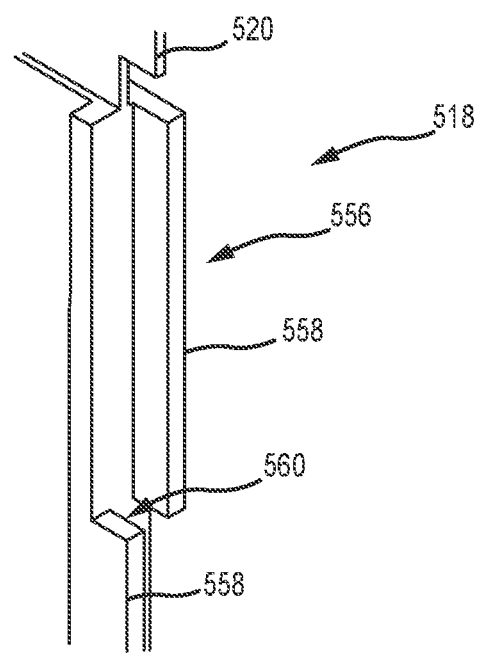
Figure 8C:
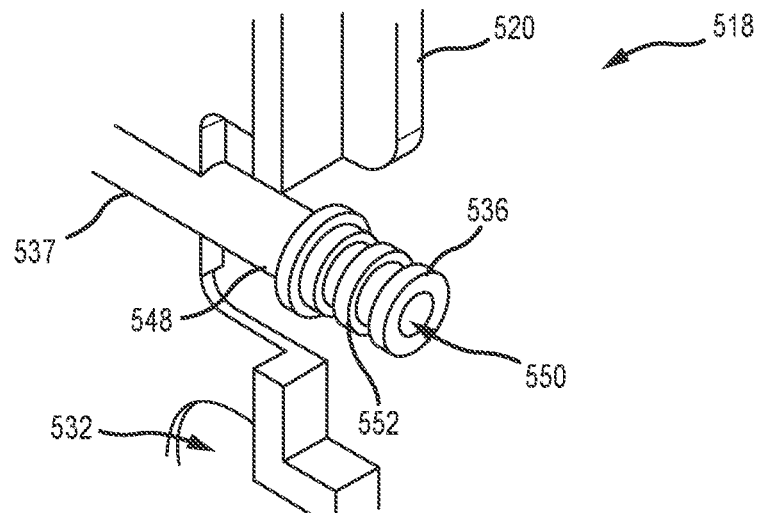
Figure 8D:
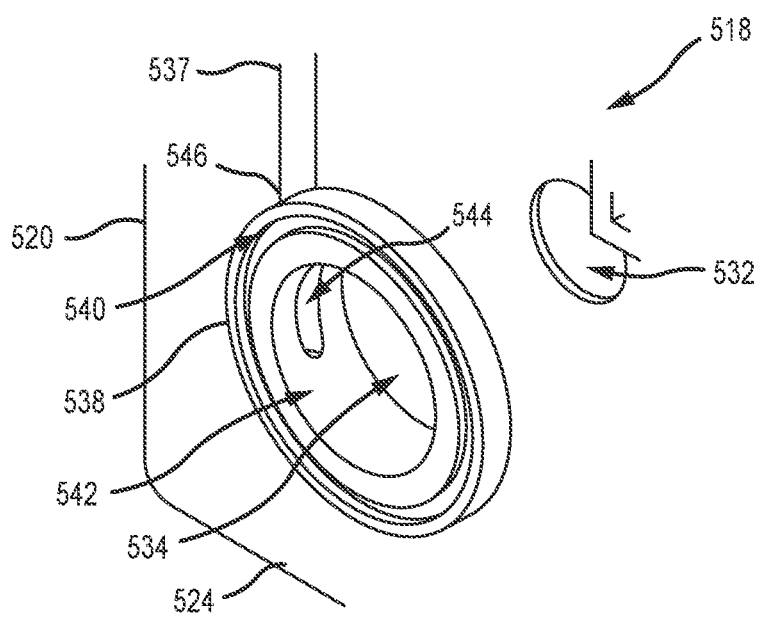

FIG. 7 illustrates a perspective view of the frame segment 518. FIG. 8A-8D illustrate enlarged detail views of the frame segment 518. Referring concurrently to FIGS. 7-8D and continued reference to FIGS. 5 and 6, each frame segment 518 includes a body 520 having a first end 522 and a second end 524. The first end 522 includes an extension connection element 526 (shown in detail in FIG. 8A) and the second end 524 includes a receiver connection element 528 such that two adjacent frame segments 518 may interlock with each other. For example, the extension connection element 526 may include two circular extensions 530 defined on a planar extension 531 having a reduced thickness. The receiver connection element 528 may include two corresponding circular apertures 532 defined on a planar extension 533 having a reduced thickness. For example, the first end 522 of one frame segment 518A may be received within the second end 524 of an adjacent frame segment 518B. The connection between frame segments may be a snap-fit connection, friction-resistance connection, or any other connection type that interlocks the frame segments 518 together.

Each frame segment 518 also includes a frame channel 534 (shown in detail in FIG. 8D) defined in the body 520 and a plug 536 (shown in detail in FIG. 8C) extending from the body 520. An electrolyte pathway 537 extends between the frame channel 534 and the plug 536 such that a flow of electrolytes may be channeled between the cell plate 504 and the frame channel 534. The frame channel 534 may be further defined within a sealing element 538 that extends outward from the body 520. The sealing element 538 is configured to mate with an adjacent sealing element 538 such that an elongate frame channel is formed through the cell stack for channeling the electrolyte flow to and from the reservoirs as described above. For example, a recess 540 may be defined on one end of the sealing element 538 while a corresponding extension (not shown) is defined on the opposite end of the sealing element 538 such that adjacent sealing elements 538 may be mated and sealed together. Along an annular surface 542 of the frame channel 534, a circumferential opening 544 may be defined therein. A first end 546 of the electrolyte pathway 537 is coupled in fluidic communication with the opening 544 such that the electrolyte flow may be channeled into the electrolyte pathway 537.

The plug 536 is disposed at a second end 548 of the electrolyte pathway 537 and extends from the body 520. In the example, the plug 536 includes an opening 550 extending therethrough and the plug 536 is sized and shaped to be received by a corresponding orifice 516 of the cell plate 504. For example, the plug 536 is substantially cylindrical and includes one or more annular ribs 552 such that a sealed fluidic connection is made between the frame segment 518 and the cell plate 504. In some examples, the plug 536 and/or the second end 548 may be flexible so as to enable the cell plate to float and move relative to the frame assembly 502 and further reduce the impact of the frame segment manufacturing tolerances. In one example, the cell plate 504 may float approximately 0.6 inches with respect to the frame assembly 502.

In the example, the electrolyte pathways 537 facilitate channeling an electrolyte flow from an electrolyte reservoir to the cell plate 504 for operation of the system as described above. For example, one or more of the electrolyte pathways 537 may be a catholyte supply pathway that delivers a catholyte solution to the cell plate 504, a catholyte return pathway that returns a catholyte solution to a catholyte reservoir and/or other frame plate assemblies, an anolyte supply pathway that delivers an anolyte solution to the cell plate 504, and/or an anolyte return pathway that returns an anolyte solution to an anolyte reservoir and/or other frame plate assemblies.

The electrolyte pathways 537 may be formed by a variety of methods. In the example, the electrolyte pathways 537 are integral and defined within the body 520. As such the plug 536, the pathways 537, and the body 520 are unitary. The integral pathways may be formed by gas assist or thermal injection molding, through additive manufacturing processes, or any other manufacturing process. In alternative examples, the electrolyte pathways 537 may be a separate component and include a substantially inert tubing that is disposed within an electrolyte cutaway defined within the body 520. The tubing may be polyurethane, polypropylene, or any other inert material.

In further alternative examples, the electrolyte pathways 537 may include electrolyte shunt pathways 554. The shunt pathways 554 extend for a predetermined length so as to control the electrical resistance and the fluid resistance of the electrolyte flow therein. For example, in certain applications, it may be desirable to increase electrical resistance to prevent shunt currents within the frame segment 518 and/or across frame segments within a cell stack. Additionally, for certain applications, it may be desirable to decrease fluid resistance within the frame segment 518 and/or across frame segments within a cell stack. In aspects of the technology, electrical resistance is controlled by changing various elements of the frame assembly 502. For example, the material of the electrolyte shunt pathways 554, the length of the electrolyte shunt pathways 554, the size and shape of the electrolyte shunt pathways 554 (e.g., diameter of the electrolyte shunt pathway openings) and the material, the size, and the shape of the plug 536 may alter the electrical resistance in the frame assembly 502.

Adjacent to the plug 536, each frame segment 518 may also include a plate connector 556 (shown in detail in FIG. 8B) extending from the body 520. The plate connector 556 is configured to receive at least a portion of the side wall 510 of the cell plate 504 so as to couple the frame assembly 502 to the cell plate 504 and restrict movement and flexing of sealing surfaces (e.g., between the plug 536 and the orifice 516) to reduce electrolyte leakage. As such, when the frame assembly 502 moves relative to the cell plate 504 the plate connector 556 directs the flex stresses into the body 520 of the frame segment 518 and/or the electrolyte pathway tubing. For example, the plate connector 556 includes two or more alternating flanges 558 that define a recess 560 therebetween, which receives the corresponding cell plate flange 514. In alternative examples, any other connection element may be used that enables the cell plate 504 to be coupled to the frame segment 518 as described herein. In additional examples, the cell plate 504 may be segmented into two or more members and each frame segment 518 may be bonded to the corresponding cell plate member in order to facilitate forming the frame plate assembly 500.

Additionally illustrated are one or more bores 562 defined within each frame segment 518. The bores 562 are circular cut-outs adapted to receive framing members, such as rods, and as described above.

Figure 9:
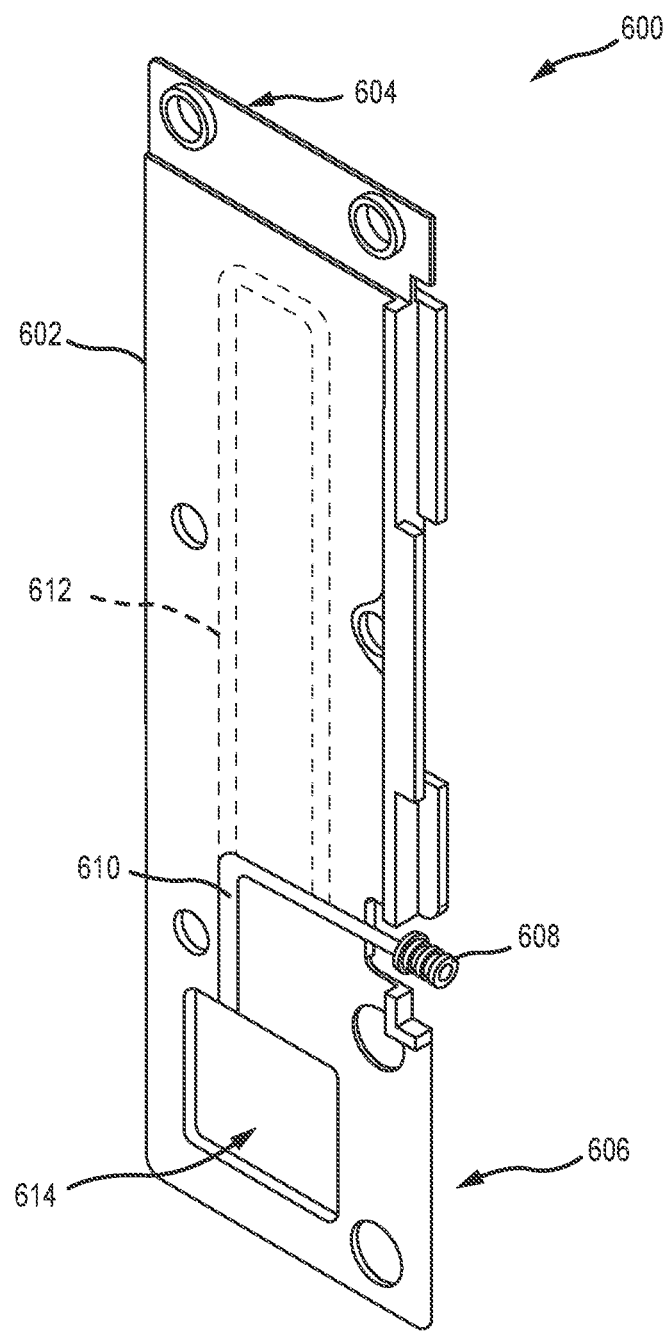
FIG. 9 illustrates a perspective view of another example frame segment that may be used with the frame plate assembly shown in FIG. 5.

FIG. 9 illustrates a perspective view of another example frame segment 600 that may be used with the frame plate assembly 500 (shown in FIG. 5). Similar to the example described above, the frame segment 600 includes a body 602 having an extension connection element 604, a receiver connection element 606, a plug 608, and an electrolyte pathway 610 or shunt pathway 612. However, in this example, a frame channel area 614 is defined in the body 602. The frame channel area 614 is sized and shaped to receive a removable corner member (shown in FIGS. 10 and 11) so as to form all or part of the frame channel within the frame segment. One advantage of having a removable corner member form all or a part of a frame channel is it may allow for easier manufacturing. In use, frame channels of one frame plate assembly may couple to frame channels of another, adjacent frame plate assembly. As such, it is desirable, in aspects, to have the frame channels form a robust seal with the other frame channels. One reason is that a robust seal will aid in reducing leakage of the electrolyte solution as the electrolyte solution flows from frame plate assembly to frame plate assembly. To achieve a robust seal, it is beneficial, in aspects, to manufacture each frame channel to couple robustly with its adjacent frame channel. In some aspects, this means manufacturing complementary geometries between two adjacent frame channels. For example, where two frame channels couple together via a substantially planar face having a sealing element, such as an o-ring, the degree to which both frame channel's coupling surfaces are flat may aid in maintaining a robust seal. Having the removable corner members form all or a part of the frame channel may allow for the removable corner members to be manufactured at high precision levels without necessarily needing to have the rest of the frame segment body 602 be at such a high precision level. For some manufacturing processes, this may decrease the overall manufacturing cost and complexity. Examples of the removable corner members are discussed further below.

FIGS. 10A-10D illustrate various views of an example radial connector insert 700 that may be used with the frame segment 600 (shown in FIG. 9). In particular, FIG. 10A, FIG. 10B, FIG. 10C, and FIG. 10D illustrate front, side, perspective, and back views, respectively, of the removable corner member that is the radial connector insert 700. The radial connector insert 700 may be used to allow an electrolyte solution to flow from one frame channel of a first frame plate assembly to a second frame channel of an adjacent, second frame plate assembly. The radial connector insert 700 includes a rectangular prism insert body 702. In other aspects, the body 702 may be any other shape as required or desired. A connection element 704 extends from the body 702 which, in operation, fluidically couples the insert 700 to an electrolyte pathway.

The connection element 704 extends orthogonally from a first wall 706 of the body 702. In aspects of the technology, the connection element 704 may be a tube with a press-fit, snap-fit, threaded connection, or any other connection such that the connection element resiliently engages with a frame end of an electrolyte pathway, such as an anolyte or catholyte pathway described with more detail above. In aspects, this allows a frame channel 708 defined in the body 702 to be in fluidic communication with one or more cell plates. For example, in aspects, the connection element 704 has a pathway 710 defined therein that fluidically couples the frame channel 708 to the electrolyte pathway of a frame plate assembly when in operation. Specifically, the frame channel 708 may be defined by an annular wall 712 to which the pathway 710 extends to.

The radial connector insert 700 includes the frame channel 708 that allows, in aspects, an electrolyte to flow from one frame plate assembly to another frame plate assembly and/or to an electrolyte reservoir. Indeed, each radial connector insert 700 may have a sealing element 714 that protrudes from a front face 716 of the body 702 and may be adapted to couple to a back face 718 of an adjacent removable corner member. As illustrated, the sealing element 714 protrusion has a face 720 that may be substantially planar. In some aspects, the face 720 may couple to an o-ring or other material to aid in forming a robust seal with an adjacent frame channel (the adjacent frame channel may be another removable corner member).

An attachment element 722 may correspond to a receiving element (not shown) of a frame segment, such as the frame segment described with reference to FIG. 9. For example, the attachment element 722 may be a tongue that protrudes from a side wall of the radial connector insert 700 and inserts into a corresponding slot of the frame segment. In other aspects, other attachment elements may be used, such as snap fittings. This may allow the radial connector insert 700 to be removably inserted into the body of the frame segment.

FIGS. 11A-11D illustrate various views of an example radial spacer insert that may be used with the frame segment shown in FIG. 9. In particular, FIG. 11A, FIG. 11B, FIG. 11C, and FIG. 11D illustrate front, side, perspective, and back views, respectfully, of a removable corner member that is a radial spacer insert 800. The radial spacer insert 800 may be used to allow an electrolyte solution to flow from one frame channel of a first frame plate assembly to a second frame channel of a second frame plate assembly without being channeled into an electrolyte pathway. As illustrated, the radial spacer insert 800 includes a rectangular prism insert body 802. In other aspects, the body 802 may be any other shape as required or desired.

As illustrated, the radial spacer insert 800 has a frame channel 804 defined in the body 802 that allows, in aspects, an electrolyte to flow from one frame plate assembly to another, adjacent frame plate assembly. Indeed, the radial spacer insert 800 may have a sealing element 806 that protrudes from a front face 808 of the body 802 and may be adapted to couple to a back face 810 of an adjacent removable corner member. As illustrated, the sealing element 806 is a protrusion that has a face 812 that may be substantially planar. In some aspects, the face 812 of the sealing element 806 may couple to an o-ring or other material to aid in forming a robust seal with an adjacent frame channel (part or all of the adjacent frame channel may be another removable corner member).

An attachment element 814 may correspond to a receiving element (not shown) of a frame segment, such as the frame segment described with reference to FIG. 9. For example, the attachment element 814 may be a tongue that protrudes from a side wall and inserts into a corresponding slot of the frame segment. In this example, the attachment element 814 may extend substantially around the perimeter of the body 802 because electrolyte flow does not need to be channeled between the frame channel 804 and the electrolyte pathways. In other aspects, other attachment elements may be used, such as snap fittings. This may allow the radial spacer insert 800 to be removably inserted into the body of the frame segment.

Figure 12:
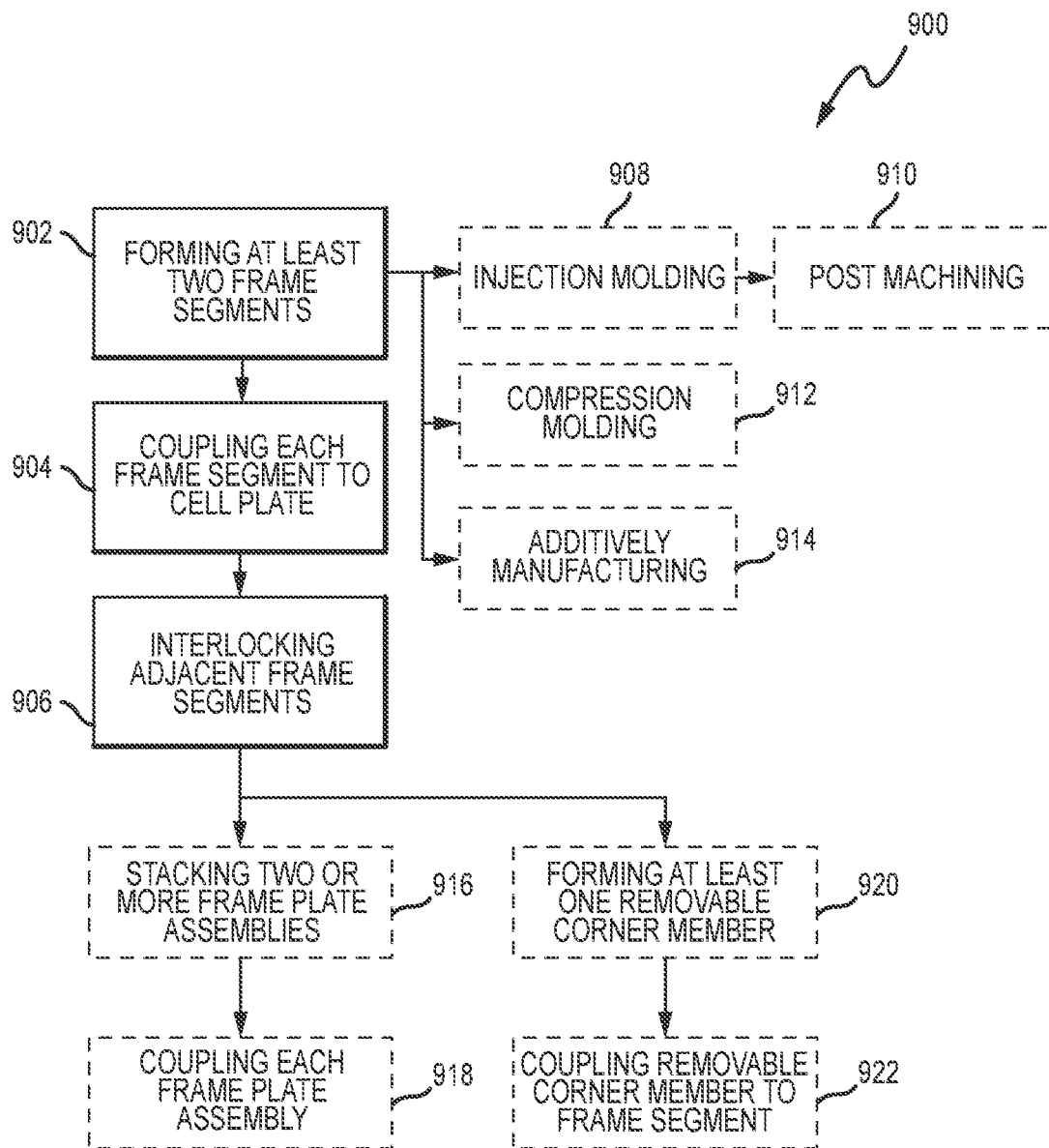
FIG. 12 illustrates a flowchart of an example method of assembling a frame plate assembly.

FIG. 12 illustrates a flowchart of an example method 900 of assembling a frame plate assembly that includes a cell plate and a frame assembly. The method includes forming at least two frame segments of the frame assembly (operation 902), coupling each frame segment of the at least two frame segments in fluidic communication to the cell plate (operation 904); and interlocking adjacent frame segments such that the frame assembly at least partially surrounds a perimeter of the cell plate (operation 906).

In this example, utilizing frame segments improves manufacture of the frame assembly components to desired predetermined tolerances and also reduces material use. By reducing the size of the frame segments, rapid cycling injection molding (operation 908) may be used with or without post machining (operation 910). In other examples, compression molding (operation 912) may be used for component manufacturing. In additional examples, component manufacturing may include molding, gas assist, additive manufacturing (operation 914), or any other process.

In some examples, the method 900 further includes stacking two or more frame plate assemblies (operation 916), and coupling each frame plate assembly of the two or more frame plate assemblies in fluidic communication, wherein the stack of two or more frame plate assemblies form at least a portion of the redox cell stack (operation 918). In other examples, the method further 900 includes forming at least one removable corner member (operation 920) and coupling the at least one removable corner member to each frame segment (operation 922).

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention

EXAMPLE EMBODIMENTS

For reasons of completeness, various aspects of the disclosure are set out in the following numbered clauses:

Clause 1. A frame plate assembly for a redox cell stack, the frame plate assembly comprising: a cell plate; and a frame assembly coupled in fluidic communication to the cell plate, wherein the frame assembly is configured to at least partially surround a perimeter of the cell plate and to channel at least one flow of electrolytes to the cell plate, the frame assembly comprising at least two frame segments, wherein each frame segment of the at least two frame segments comprises: a body having a first end and a second end; an extension connection element disposed at the first end; and a receiver connection element disposed at the second end, wherein two adjacent frame segments are configured to interlock via the extension connection element being received in the receiver connection element.

Clause 2. The frame plate assembly of Clause 1, wherein the frame assembly comprises three frame segments.

Clause 3. The frame plate assembly of Clause 1, wherein the frame assembly comprises four frame segments.

Clause 4. The frame plate assembly of Clause 1, wherein each frame segment further comprises: at least one frame channel defined in the body and configured to channel the at least one flow of electrolytes therethrough; at least one plug extending from the body and configured to be at least partially received in the cell plate; and at least one electrolyte pathway defined in the body and extending between the at least one frame channel and the at least one plug such that the at least one flow of electrolytes is channeled between the cell plate and the at least one frame channel.

Clause 5. The frame plate assembly of Clause 4, wherein the at least one electrolyte pathway comprises an electrolyte shunt pathway.

Clause 6. The frame plate assembly of Clause 4, wherein the at least one plug is unitary with the body.

Clause 7. The frame plate assembly of Clause 4, wherein the at least one frame channel is defined by a sealing element extending from the body.

Clause 8. The frame plate assembly of Clause 4, wherein the at least one frame channel is defined in a removable corner member configured to removably attach to the body.

Clause 9. The frame plate assembly of Clause 1, wherein each frame segment of the at least two frame segments further comprises at least one plate connector configured to couple the frame segment to the cell plate.

Clause 10. The frame plate assembly of Clause 1, wherein the cell plate comprises at least two plate members, and wherein each frame segment of the at least two frame segments is bonded to the corresponding plate member.

Clause 11. The frame plate assembly of Clause 1, wherein the cell plate is configured to float about 0.6 inches with respect to the frame assembly.

Clause 12. A method of assembling a frame plate assembly for a redox cell stack, the frame plate assembly including a cell plate and a frame assembly, the method comprising: forming at least two frame segments of the frame assembly; coupling each frame segment of the at least two frame segments in fluidic communication to the cell plate; and interlocking adjacent frame segments such that the frame assembly at least partially surrounds a perimeter of the cell plate.

Clause 13. The method of Clause 12, wherein forming the at least two frame segments further includes injection molding each frame segment.

Clause 14. The method of Clause 13 further comprising post machining each frame segment.

Clause 15. The method of Clause 12, wherein forming the at least two frame segments further includes compression molding each frame segment.

Clause 16. The method of Clause 12, wherein forming the at least two frame segments further includes additively manufacturing each frame segment.

Clause 17. The method of Clause 12 further comprising: stacking two or more frame plate assemblies; and coupling each frame plate assembly of the two or more frame plate assemblies in fluidic communication, wherein the stack of two or more frame plate assemblies form at least a portion of the redox cell stack.

Clause 18. The method of Clause 12 further comprising: forming at least one removable corner member; and coupling the at least one removable corner member to each frame segment.

What is claimed:

1. A frame plate assembly for a redox cell stack, the frame plate assembly comprising:
   a cell plate; and
   a frame assembly coupled in fluidic communication to the cell plate, wherein the frame assembly is configured to at least partially surround a perimeter of the cell plate and to channel at least one flow of electrolytes to the cell plate, the frame assembly comprising at least two frame segments, wherein each frame segment of the at least two frame segments comprises:
   a body having a first end and a second end;
   an extension connection element disposed at the first end; and
   a receiver connection element disposed at the second end, wherein two adjacent frame segments are configured to interlock via the extension connection element being received in the receiver connection element; wherein at least one frame segment further comprises at least one electrolyte pathway defined in the body; and wherein each frame segment of the at least two frame segments further comprises at least one plate connector configured to couple the frame segment to the cell plate.

2. The frame plate assembly of claim 1, wherein the frame assembly comprises three frame segments.

3. The frame plate assembly of claim 1, wherein the frame assembly comprises four frame segments.

4. The frame plate assembly of claim 1, wherein each frame segment further comprises:
   at least one frame channel defined in the body and configured to channel the at least one flow of electrolytes therethrough;
   at least one plug extending from the body and configured to be at least partially received in the cell plate; and
   the at least one electrolyte pathway extending between the at least one frame channel and the at least one plug such that the at least one flow of electrolytes is channeled between the cell plate and the at least one frame channel.

5. The frame plate assembly of claim 4, wherein the at least one electrolyte pathway comprises an electrolyte shunt pathway.

6. The frame plate assembly of claim 4, wherein the at least one plug is unitary with the body.

7. The frame plate assembly of claim 4, wherein the at least one frame channel is defined by a sealing element extending from the body.

8. The frame plate assembly of claim 4, wherein the at least one frame channel is defined in a removable corner member configured to removably attach to the body.

9. The frame plate assembly of claim 1, wherein each frame segment of the at least two frame segments further comprises at least one plate connector configured to couple the frame segment to the cell plate.

10. The frame plate assembly of claim 1, wherein the cell plate is configured to float with respect to the frame assembly.

11. A method of assembling a frame plate assembly for a redox cell stack, the frame plate assembly including a cell plate and a frame assembly, the method comprising:
    forming at least two frame segments of the frame assembly;
    coupling each frame segment of the at least two frame segments in fluidic communication to the cell plate; and
    interlocking adjacent frame segments such that the frame assembly at least partially surrounds a perimeter of the cell plate; wherein at least one frame segment further comprises at least one electrolyte pathway defined in the body; and wherein each frame segment of the at least two frame segments further comprises at least one plate connector configured to couple the frame segment to the cell plate.

12. The method of claim 11, wherein forming the at least two frame segments further includes injection molding each frame segment.

13. The method of claim 12 further comprising post machining each frame segment.

14. The method of claim 11, wherein forming the at least two frame segments further includes compression molding each frame segment.

15. The method of claim 11, wherein forming the at least two frame segments further includes additively manufacturing each frame segment.

16. The method of claim 11 further comprising:
   stacking two or more frame plate assemblies; and
   coupling each frame plate assembly of the two or more frame plate assemblies in fluidic communication, wherein the stack of two or more frame plate assemblies form at least a portion of the redox cell stack.

17. The method of claim 11 further comprising:
   forming at least one removable corner member; and
   coupling the at least one removable corner member to each frame segment.

\* \* \* \* \*